2,886,588

INTERMEDIATES FOR THE PRODUCTION OF AN UNSATURATED DIALDEHYDE

Otto Isler, Marc Montavon, and Rudolf Rüegg, Basel, and Paul Zeller, Neuallschwil, near Basel, Switzerland, assignors to Hoffmann-La Roche Inc., Nutley, N.J., a corporation of New Jersey No Drawing. Application January 17, 1957
Serial No. 634,613

Claims priority, application Switzerland January 20, 1956

6 Claims. (Cl. 260—476)

The present invention relates to a novel process for preparing an unsaturated dialdehyde, particularly 2,7-dimethyl-2,6-octadien-4-yne-1,8-dial which is an important intermediate in the synthesis of carotenoid compounds. Furthermore, the invention relates to novel acetylene diol compounds which are useful as intermediates in the synthesis of 2,7-dimethyl-2,6-octadien-4-yne-1,8-dial, and to a process for preparing said intermediates.

The novel process for preparing 2,7-dimethyl-2,6-octadien-4-yne-1,8-dial according to this invention comprises condensing acetylene dimagnesium halide at both ends with a compound having the general formula

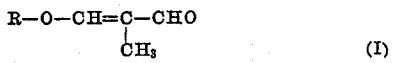

wherein R represents a member selected from the group consisting of alkyl and acyl radicals, hydrolyzing the resulting condensation product and treating the resulting acetylene diol compound with acid.

The acetylene diol compounds of this invention which are useful as intermediates in the synthesis of the dialdehyde have the general formula

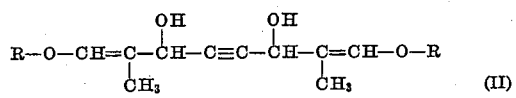

wherein R is a member selected from the group consisting of alkyl and acyl radicals.

Preferred compounds of Formula II are those wherein R is a lower alkyl, lower alkanoyl, or aroyl radical.

According to this invention the compounds of Formula II are prepared by a process which comprises condensing acetylene dimagnesium halide at both ends with a compound having the general formula

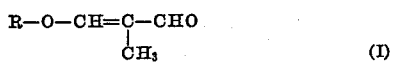

wherein R has the meaning as defined above, and hydrolysing the resulting condensation product.

In the above Formulae I and II R can represent, e.g., a lower alkyl radical, such as methyl, ethyl, isopropyl, n-propyl and the like; a lower alkanoyl radical, such as formyl, acetyl, propionyl and the like; or an aroyl radical such as benzoyl, toluolyl and the like.

Those of the starting compounds of Formula I wherein R is an alkyl radical can be prepared, e.g. by condensing a propenyl ether, e.g. propenyl ethyl ether, with an orthoformic acid ester, e.g., ethyl ortho-formate, in the presence of boron trifluoride etherate, treating the resulting methyl-malondialdehyde tetraalkyl acetal with acid in order to eliminate the acetal groups, and condensing the resulting product with an aliphatic alcohol, preferably a lower alkanol, in the presence of p-toluenesulfonic acid. Those of the starting compounds of Formula I wherein R is an acyl radical can be prepared, e.g., by treating the methyl-malondialdehyde tetraalkyl acetal, prepared as described above, with sulfuric acid and then with sodium hydroxide to form the sodium salt of methyl-malondialdehyde, and condensing the latter with an acyl halide, e.g. acetyl chloride or benzoyl chloride.

A preferred class of starting compounds of Formula I comprises 3-ethoxy-2-methyl-2-propen-1-al (B.P. 78–80° C./13 mm.; $n_D^{24}=1.4755$), 3-isopropoxy-2-methyl-2-propen-1-al (B.P. 83° C./13 mm.; $n_D^{21}=1.4745$; U.V. absorption maximum at 242 m$\mu$), 3-acetoxy-2-methyl-2-propen-1-al (B.P. 75–77° C./10 mm.), and 3-benzoyloxy-2-methyl-2-propen-1-al (M.P. 79–80° C.).

The process for preparing 2,7-dimethyl-2,6-octadien-4-yne-1,8-dial according to the present invention is carried out in two steps; however, the intermediate need neither be isolated nor purified. A convenient mode of carrying out this process consists in first preparing a suspension of an acetylene dimagnesium halide by passing purified acetylene for about 12 hours into a solution (preferably in ether) of an alkyl magnesium halide, e.g. ethyl magnesium bromide or hexyl magnesium bromide. Care must be taken to maintain the acetylene dimagnesium bromide, which is insoluble in the solvent, in finely suspended form, e.g. by vigorous stirring. Then, 2 moles of a 3-alkoxy- or 3-acyloxy-2-methyl-2-propen-1-al for each mole of acetylene dimagnesium bromide are rapidly dropped into the suspension, whereupon the reaction mixture can be boiled for some time. The hydrolysis of the formed condensation product is preferably carried out by means of aqueous solutions of ammonium chloride or ammonium acetate. The resulting acetylene diols are, as a rule, obtained in the form of oils. They are characterized by the Zerewitinoff test. The acetylene diols can be treated, without any preliminary purification, with an acid, preferably with a strong aqueous mineral acid or sulfonic acid, such as sulfuric acid, phosphoric acid, p-toluenesulfonic acid, or a strong organic acid, such as acetic acid, oxalic acid, etc. If a 3-alkoxy methyl propenal is used as starting compound, the acid treatment can be effected by shaking an ethereal solution of the formed acetylene diol at room temperature with aqueous sulfuric acid for 10 to 15 hours. If, however, a 3-acyloxy methyl propenal is used as starting compound, it is advisable to boil the obtained acetylene diol for 1 to 5 hours with sulfuric acid in acetone solution. This acid treatment results in an allyl rearrangement and a saponification of the alkoxy and acyloxy groups, respectively, with formation of 2,7-dimethyl-2,6-octadien-4-yne-1,8-dial. According to another mode of carrying out the invention, the formed condensation product can be directly treated with acid without first hydrolyzing it by means of ammonium salts. In this manner the hydrolysis of the metal salts, the allyl rearrangement and the saponification of the alkoxy or acyloxy groups present occur simultaneously with direct formation of 2,7-dimethyl-2,6-octadien-4-yne-1,8-dial.

The isolation of the end product from the reaction mixture can be carried out by crystallization, distillation or sublimation of the crude product obtained after separation of the solvent.

The invention is further illustrated by the following examples, which are illustrative but not limitative thereof.

Example 1

Purified acetylene was bubbled into a solution of ethyl magnesium bromide in ether (prepared from 25 g. of magnesium, 145 g. of ethyl bromide and 500 ml. of absolute ether) at 0° C. for 20 hours. Then, a solution of 64 g. of 3-isopropoxy-2-methyl-2-propen-1-al in 50 ml. of absolute ether was run into the solution within 5 minutes, while stirring quickly. Subsequently, the reaction mixture was refluxed for 1 hour, cooled and hydrolyzed by means of aqueous ammonium acetate solution. The ethereal layer was separated, washed once with sodium bicarbonate solution and then with water, dried over sodium sulfate, filtered, and concentrated in vacuo. There were thus obtained about 70 g. of 1,8-di-isopropoxy-3,6-dihydroxy-2,7-dimethyl-1,7-octadien-4-yne in the form of a highly viscous oil. In the Zerewitinoff test this compound showed two active hydrogen atoms. The product was dissolved in 200 ml. of ordinary ether, traces of hydroquinone and then 50 ml. of 3 N sulfuric acid were added, and the mixture was shaken for 12 hours at room temperature in a carbon dioxide atmosphere. The ethereal layer was then separated, washed neutral, dried and concentrated. The residue, which weighed about 40 g., crystallized on cooling. The resulting product had a content of at least 50% of the desired 2,7-dimethyl-2,6-octadien-4-yne-1,8-dial, as determined by the absorption spectrum. The isolation was effected by recrystallization from petroleum ether (boiling range 80–100° C.), sublimation in a high vacuum at 50° C., or distillation in a high vacuum; B.P. 95–97° C./0.05 mm.; M.P. 68° C.; absorption spectrum: maxima at 310 and 330 m$\mu$, $E_{1\ cm.}^{1\%}$=2054 and 2180 (in petroleum ether)

The procedure of Example 1 was repeated, except that a corresponding amount of a 3-acyloxy-2-methyl-2-propen-1-al, e.g. 3-acetoxy-2-methyl-2-propen-1-al, was used instead of 3-isopropoxy-2-methyl-2-propen-1-al and that the hydrolysis of the condensation product was carried out with sulfuric acid in boiling acetone. Similar results were obtained.

The 3-isopropoxy-2-methyl-2-propen-1-al used as starting material in this Example was prepared as follows:

620 ml. of ethyl ortho-formate were mixed in a stirring flask with 1.6 ml. of boron trifluoride etherate, and the mixture was heated to 30° C. Into this mixture was dropped a mixture of 520 ml. of propenyl ethyl ether and 620 ml. of ethyl ortho-formate. The exothermic reaction was maintained at a temperature between 30 and 40° C. by adjusting the rate of dropping and, if necessary, by external cooling. When the reaction was completed, the solution was washed with sodium bicarbonate solution, then dried and subjected to fractional distillation. The excess ethyl ortho-formate added was obtained as a fore-run. The resulting methyl-malon-di-aldehyde tetra-ethyl acetal boiled at 93–95° C./10 mm.; $n_D^{20°}$=1.4132. 234 g. of this product were heated at 40° C. for 6 hours in 100 ml. of 3 N sulfuric acid, and 100 ml. of 3 N caustic soda solution were then added to the reaction mixture. The water-alcohol mixture was concentrated in vacuo at 40° C., and 300 ml. of benzene were added to the residue. From this solution approximately 200 ml. of solvent were evaporated, and 350 ml. of benzene, 1 g. of p-toluene-sulfonic acid and 100 ml. of isopropyl alcohol were added to the residue. The mixture was boiled, and the azeotropic distillate was separated in a water separator. When no more water separated, the solution was cooled, the adhering acid was removed by washing with sodium bicarbonate, and the solution was dried over potassium carbonate. Fractional distillation yielded 3-isopropoxy-2-methyl-2-propen-1-al of B.P. 83° C./13 mm.; $n_D^{21°}$=1.4745; U.V. absorption maximum at 242 m$\mu$. Yield: 70%.

*Example 2*

To the suspension of acetylene dimagnesium bromide in ether prepared in the manner described in Example 1 there was added a solution of 170 g. of 3-benzoyloxy-2-methyl-2-propen-1-al in 750 ml. of methylene chloride, and the reaction mixture was treated in the manner described in Example 1. The crude 1,8-dibenzoyloxy-3,6-dihydroxy-2,7-dimethyl-1,7-octadien-4-yne (containing 2 active hydrogen atoms) was refluxed for 2 hours with 350 ml. of acetone and 20 ml. of 20% sulfuric acid in a nitrogen atmosphere. The reaction mixture was poured into water, neutralized with sodium carbonate, and the resulting 2,7-dimethyl-2,6-octadien-4-yne-1,8-dial was isolated in the manner described in Example 1.

The 3-benzoyloxy-2-methyl-2-propen-1-al used as starting material in the above example was prepared as follows:

468 g. of methyl-malondialdehyde tetraethyl acetal prepared as described in Example 1 were heated for 6 hours at 40° C. together with 528 ml. of water and 53 ml. of 3 N sulfuric acid. A small amount of phenolphthalein was added to the cooled mixture, and then 4 N caustic soda solution was added until the red colour persisted. The reaction mixture was concentrated to dryness in vacuo at 55° C., and the residue was recrystallized from alcohol. There were thus obtained 70% of the sodium salt of methyl-malondialdehyde. 54 g. of this salt were suspended in 250 ml. of methylene chloride, and to the suspension there were added, while stirring, 60 ml. of benzoyl chloride. After refluxing for 2 hours, the precipitated sodium chloride was separated, and the filtrate was concentrated to a volume of 100–150 ml. To the concentrate were added, while agitating, 1200 ml. of low-boiling petroleum ether, and the precipitation was completed by cooling. The product obtained after filtering and drying melted at 79–80° C.; yield: 80%.

We claim:

1. A compound having the general formula

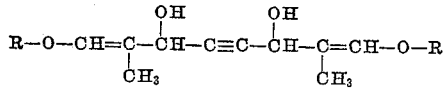

wherein R is a member selected from the group consisting of lower alkyl, lower alkanoyl and monocyclic aroyl radicals.

2. A compound according to claim 1 wherein R is a lower alkyl radical.

3. A compound according to claim 1 wherein R is a monocyclic aroyl radical.

4. A compound according to claim 1 wherein R is a lower alkanoyl radical.

5. 1,8-di-isopropoxy-3,6-dihydroxy - 2,7 - dimethyl-1,7-octadien-4-yne.

6. 1,8-dibenzoyloxy - 3,6 - dihydroxy-2,7-dimethyl-1,7-octadien-4-yne.

References Cited in the file of this patent

UNITED STATES PATENTS

| 2,415,834 | Milas | Feb. 18, 1947 |
| 2,441,540 | Ash et al. | May 11, 1948 |
| 2,533,172 | McKinley | Dec. 5, 1950 |
| 2,577,867 | Wendler et al. | Dec. 11, 1951 |

OTHER REFERENCES

Mildner et al.: J. Chem. Soc., 1953, 3294.
Royals: Advanced Organic Chemistry (1956), 1st printing 1954, pp. 521, 522, 628.